April 27, 1926.
W. RAMSAY
DRY CELL
Filed March 24, 1924
1,582,687
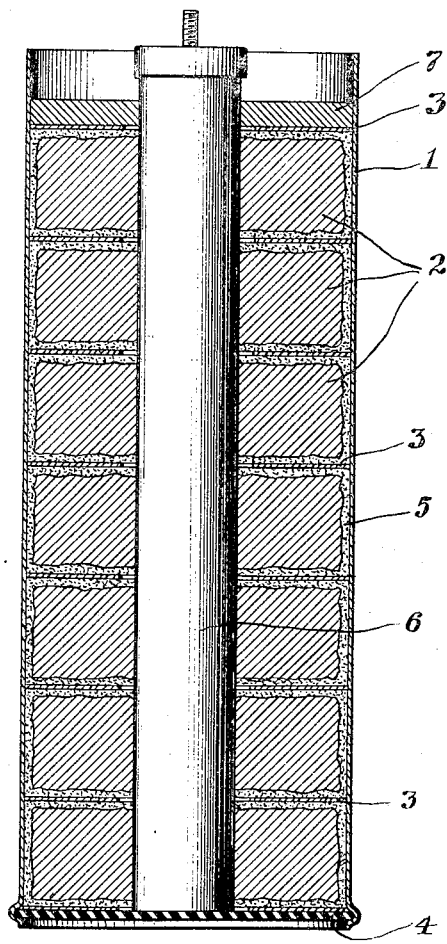
INVENTOR
William Ramsay
BY Paneskolish
ATTORNEY Patented Apr. 27, 1926.

1,582,687

UNITED STATES PATENT OFFICE.

WILLIAM RAMSAY, OF WESTFIELD, NEW JERSEY, ASSIGNOR TO MANHATTAN ELECTRICAL SUPPLY COMPANY, INCORPORATED, OF NEW YORK, N. Y., A CORPORATION OF MASSACHUSETTS.

DRY CELL.

Application filed March 24, 1924. Serial No. 701,451.

*To all whom it may concern:*

Be it known that I, WILLIAM RAMSAY, a subject of the King of Sweden, residing at Westfield, in the county of Union and State of New Jersey, United States of America, have invented certain new and useful Improvements in Dry Cells, of which the following is a specification.

This invention relates to dry cells and more particularly to an improved lining or separator for dry cells.

In accordance with the present invention the lining, by means of which the depolarizing mix is separated from the zinc electrode, consists of a layer of manganese dioxide or other suitable depolarizing material. The insulating qualities of such layer are sufficient to answer the purpose and if the manganese dioxide is provided in a coarsely powdered form, it will be sufficiently absorbent to hold a large quantity of liquid. Furthermore, some of the manganese dioxide, which is in contact with the depolarizing mixture, will act as a depolarizer.

The invention is particularly applicable to dry cells of the type in which the depolarizing mixture consists of compacted tablets. In such structures the manganese dioxide separation could be readily and cheaply applied by compacting it in the form of a coating partially or entirely surrounding the tablet. In order to prevent any migration of fine graphite that is contained in the depolarizing mix and for strengthening the physical construction, the manganese dioxide used in the coating is preferably mixed with gelatinous material such as gum tragacanth, and the electrolyte may also be mixed therewith.

The drawing illustrates the embodiment of the invention into a multiple cell.

In the drawing, 1 is a zinc can containing a plurality of compacted tablets 2 which are separated from each other by means of zinc washers 3 contacting with the zinc can 1. The bottom plate 4 of the can is of some suitable insulating material. Each tablet 2 is surrounded by a relatively thin layer 5 of depolarizing material. The tablets are centrally perforated, as are the washers 3, and a carbon electrode 6 projects through these central perforations. The cell is sealed at 7 in the usual manner.

What is claimed is:

1. In a dry cell, a zinc container, a carbon electrode therein, a mixture containing depolarizing and carbonaceous materials surrounding the carbon electrode, and a layer of depolarizing material separating said mixture from said container and contacting therewith.

2. In a dry cell, a zinc container, a carbon electrode therein, a mixture of manganese dioxide and graphite surrounding the carbon electrode, and a layer of manganese dioxide separating said mixture from said container and contacting therewith.

3. In a dry cell, a zinc container, a carbon electrode therein, a mixture of manganese dioxide and carbonaceous material surrounding the carbon electrode, and a porous layer of manganese dioxide separating said mixture from said container and contacting therewith.

4. In a dry cell, a zinc container, a carbon electrode therein, a mixture of manganese dioxide and carbonaceous material surrounding the carbon electrode, and a layer of coarsely powdered manganese dioxide mixed with gum tragacanth separating said mixture from said container.

5. In a dry cell, tablets compacted of a mixture of depolarizing and conducting materials, a layer of depolarizing material compacted around each tablet, an electrode projecting through said tablets, and a second electrode contacting with said layer.

6. In a dry cell, tablets compacted of a mixture of manganese dioxide and carbon, a coating of manganese dioxide compacted around each tablet, a carbon electrode projecting through said tablets, and a zinc electrode surrounding the tablets and contacting with said coating.

7. In a dry cell, a zinc cylinder, a plurality of tablets compacted of manganese dioxide and graphite within said zinc container, a coating of manganese dioxide compacted around each tablet, a zinc cylinder surrounding said tablets and contacting with the sides of said coating, zinc washers between adjacent tablets for contacting with the upper and lower surfaces, respectively, of said coatings, and a carbon electrode projecting through said tablets and washers.

In testimony whereof, I have signed my name to this specification this Thursday, 20th day of March 1924.

WILLIAM RAMSAY.